United States Patent
Christin et al.

(10) Patent No.: US 9,392,546 B2
(45) Date of Patent: Jul. 12, 2016

(54) METHOD FOR DEACTIVATING AT LEAST ONE COMPONENT OF AN ENTITY OF A COMMUNICATIONS NETWORK, CORRESPONDING DEVICE AND COMPUTER PROGRAM

(75) Inventors: Philippe Christin, Rennes (FR); Laurent Cariou, Rennes (FR); David Bernard, Marcille Raoul (FR)

(73) Assignee: ORANGE, Paris (FR)

( * ) Notice: Subject to any disclaimer, the term of this patent is extended or adjusted under 35 U.S.C. 154(b) by 33 days.

(21) Appl. No.: 13/509,753

(22) PCT Filed: Nov. 15, 2010

(86) PCT No.: PCT/FR2010/052423
§ 371 (c)(1),
(2), (4) Date: Aug. 28, 2012

(87) PCT Pub. No.: WO2011/058283
PCT Pub. Date: May 19, 2011

(65) Prior Publication Data
US 2013/0003628 A1    Jan. 3, 2013

(30) Foreign Application Priority Data
Nov. 13, 2009 (FR) ...................................... 09 58003

(51) Int. Cl.
*H04W 52/02* (2009.01)
(52) U.S. Cl.
CPC ............ *H04W 52/0238* (2013.01); *Y02B 60/50* (2013.01)

(58) Field of Classification Search
CPC ... H04W 52/00; H04W 52/0238; Y02B 60/50
USPC .................................. 370/311, 389, 278, 410
See application file for complete search history.

(56) References Cited

U.S. PATENT DOCUMENTS 7,016,948 B1 * 3/2006 Yildiz .................. H04W 24/08
                                                     709/221
7,983,203 B2 * 7/2011 Kakani ................. H04W 28/06
                                                     370/311

(Continued)

FOREIGN PATENT DOCUMENTS

EP          1684465 A1    7/2006

OTHER PUBLICATIONS

International Search Report and Written Opinion dated Mar. 31, 2011 for corresponding International Application No. PCT/FR2010/052423, filed Nov. 15, 2010.

(Continued)

*Primary Examiner* — Andrew Lai
*Assistant Examiner* — Sumitra Ganguly
(74) *Attorney, Agent, or Firm* — David D. Brush; Westman, Champlin & Koehler, P.A.

(57) ABSTRACT

A method and apparatus are provided for deactivating at least one component of an entity of a wireless communication network including a plurality of entities. The communication network is organized into a plurality of communication layers, including a physical layer. The method includes, in the physical layer: a step of receiving a header of a frame of data extracted from a physical signal during reception; a step of decoding the header outputting at least one piece of information showing at least one addressee entity of the frame; a step of deactivating at least one component of the recipient entity of the header when the information representing the addressee entity designates an entity other than the recipient entity.

11 Claims, 2 Drawing Sheets

(56) References Cited

U.S. PATENT DOCUMENTS

| | | | |
|---|---|---|---|
| 2003/0227893 A1* | 12/2003 | Bajic | H04L 49/70 370/338 |
| 2005/0009578 A1 | 1/2005 | Liu | |
| 2005/0025080 A1* | 2/2005 | Liu | H04W 52/0229 370/311 |
| 2005/0174927 A1 | 8/2005 | Stephens et al. | |
| 2005/0249244 A1* | 11/2005 | McNamara | H04L 1/0025 370/474 |
| 2006/0045035 A1 | 3/2006 | Liu | |
| 2006/0072614 A1* | 4/2006 | Ogiso | H04B 1/1615 370/474 |
| 2006/0242328 A1* | 10/2006 | Guo | H04W 52/0216 709/250 |
| 2007/0058575 A1 | 3/2007 | Kwon et al. | |
| 2008/0232490 A1* | 9/2008 | Gross | H04W 28/18 375/260 |
| 2010/0022261 A1* | 1/2010 | Meier | H04B 7/0604 455/500 |
| 2011/0090844 A1* | 4/2011 | Gong | H04W 52/0238 370/328 |

OTHER PUBLICATIONS

French Search Report and Written Opinion dated Aug. 16, 2010 for corresponding French Application No. FR 0958003, filed Nov. 13, 2009.

International Preliminary Report on Patentability and English Translation of Written Opinion dated Jun. 5, 2012 for corresponding International Application No. PCT/FR2010/052423, filed Nov. 15, 2010.

* cited by examiner

METHOD FOR DEACTIVATING AT LEAST ONE COMPONENT OF AN ENTITY OF A COMMUNICATIONS NETWORK, CORRESPONDING DEVICE AND COMPUTER PROGRAM

CROSS-REFERENCE TO RELATED APPLICATIONS

This Application is a Section 371 National Stage Application of International Application No. PCT/FR2010/052423, filed Nov. 15, 2010, which is incorporated by reference in its entirety and published as WO 2011/058283 on May 19, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure pertains to the field of electronic communication and more particularly to the field of radio communications, also known as wireless communications. In communications of this type, which often use nomadic communication reception entities that are battery-operated, the issue of energy consumption is a major problem for these entities. Indeed, the sending and reception of wireless digital signals are high energy-consuming operations. It is therefore necessary to provide for mechanisms to save this energy at the communications terminal.

BACKGROUND OF THE DISCLOSURE

Communications network equipment and apparatuses (transmitters and receivers) generally implement the OSI (Open Systems Interconnection) model proposed by the ISO (International Standards Organization) which describes the functions needed for communications between two entities of a computer network and the organization of these functions, distributed according to a layered structure, the lowest layer being the "physical" level layer (called the "physical layer") in charge of the effective sending and receiving of the signals. These different functions are generally implemented by specific components of the communications entities.

The physical layer interfaces with the immediately higher layer (data link layer) which manages communications between two adjacent machines, directly interconnected by a physical support through the MAC ("Medium Access Control") sub-layer.

In the OSI model, each layer has a well defined role for communications between the entities of a communications network, and each role is generally implemented by one or more components adapted to this purpose. In particular, the physical-layer/MAC-layer structure of current systems is perfectly partitioned.

The physical layer defines techniques aimed at ensuring the transmission of data at a fixed bit rate. It has no knowledge, as such, of the data transported.

The MAC layer defines techniques aimed at organizing the transmission of data from the different users, managing access to the channel, collisions, acknowledgments and retransmissions, and identifying the communications entities (the terminals in particular).

Thus, the role of the MAC layer is especially that of filtering the frames received in keeping only those intended for it, in verifying their destination MAC address.

Energy-saving modes known as "power save" modes have been defined, especially by the 802.11 standards of the IEEE (Institute of Electrical and Electronics Engineers), which guarantee interoperability between wireless communications apparatuses and especially between Wi-Fi (Wireless Fidelity) type wireless communications entities.

There are different energy-saving modes. For example, one mode, called the "legacy power save" mode is based on the exchange of signaling messages (PS-Poll), sent with low modulations and without priority. An energy savings mode of this kind is therefore unsuited to real-time traffic.

There also exists a mode known as the APSD ("Automatic Power Save Delivery") introduced into the 802.11e standard and better adapted to VOIP ("Voice Over Internet Protocol") type traffic in which the data frame is sent with a priority relative to the type of traffic, without the presence of a supplementary management frame.

Finally, the mode known as the "PSMP" (Power Save MultiPoll) mode, introduced with the 802.11n standard, stipulates that an access point will carry out the scheduling of the periods of activity and standby of each communications entity (terminal) associated with the BSS ("Basic Service Set" designating a set of synchronized communications entities).

The access point informs an entity when traffic is intended for it. When the entity is in "active" mode, it can be in one of three states: "Standby", "Reception" or "Transmission".

The idea behind these different mechanisms is that of creating energy-saving modes for the mobile reception entities in alternating between standby phases (when energy is saved) and phases of activity. The different protocols and techniques cited define the exchanges between entities and access point to manage these different phases without losing any packets: they provide for a buffer storage of the packets during the standby phase and a transmission or reception of the packets during the phase of activity.

In all these prior-art mechanisms, the placing of an entity on standby is commanded at the MAC layer, which controls the energy-saving mechanism, or at the level of the higher layers. Indeed, the information exchanges between an access point and an entity are understood and analyzed only from the MAC layer onwards. It is therefore from this layer that it is possible to control the placing of the entity on standby and its activation.

SUMMARY

An aspect of the present disclosure relates to a method for deactivating at least one component of an entity (E1) of a wireless communications network comprising a plurality of entities, said communications network being organized into a plurality of communications layers comprising a physical layer (PHY).

According to an embodiment of the invention, such a method comprises, at the physical layer (PHY):
a step for receiving a header (HEA) of a data frame (PPDU) extracted from a physical signal being received;
a step for decoding said header (HEA) delivering at least one piece of information representative (EID) of at least one addressee entity for said frame;

a step for deactivating at least one component of said recipient entity (E1) for said header (HEA), when the piece of information representative of said addressee entity designates an entity other than said recipient entity (E1).

Thus, in the context of an implementation within a wireless communications network, for example compliant with one of the IEEE 802.11 standards, an embodiment of the invention makes it possible not to continue receiving and decoding the entire PPDU data frame before detecting that this frame is not intended for the entity. Thus, the entity can be deactivated directly by the PHY layer, which is not possible with the prior-art techniques in which the decision to place the entity in deactivation is taken at the level of the MAC layer (after exchanges of control frames).

When the information representative (EID) of the addressee entity for said frame indicates that several of the entities of the communications network are addressees for the frame, the entity that implements the method of an embodiment of the invention therefore does not go into deactivation. Such a case can occur if it is assumed for example that the EID is encoded on a byte, when the piece of representative information takes for example the value FF and designates a multicast or broadcast transmission . . . .

According to one particular characteristic of an embodiment of the invention, the method furthermore comprises a step for computing a duration of deactivation as a function of at least one piece of information representative of a transmission rate (RATE) and at least one piece of information representative of a volume of data (LENGTH) of said data frame (PPDU) of the physical layer.

Thus the entity can make a precise computation of the time during which it can get deactivated and thus save energy in an optimized way. When this time has elapsed, the entity gets activated to return to a normal state of reception and can again receive the header of the next frame and recommence the analysis of the EID.

According to one particular characteristic of an embodiment of the invention, said step for deactivating comprises a step for cutting off an electrical power supply to at least one radiofrequency component of said entity.

Thus, the decision to deactivate the physical layer is taken at the physical layer itself, independently of the higher layers, unlike in the prior-art techniques which disclose a deactivation upon the order of the MAC layer.

According to one particular characteristic of an embodiment of the invention, said step for deactivating comprises a step for cutting off an electrical supply to a data reception and/or transmission chain of the physical layer.

According to another aspect, an embodiment of the invention also pertains to a method for sending a data frame (PPDU), comprising a header (HEA), by means of a sender entity of a wireless communications network comprising a plurality of entities, said communications network being organized into a plurality of communications layers comprising a physical layer (PHY), comprising a step for building said data frame. According to an embodiment of the invention such a step comprises, at said physical layer (PHY):
 a step for building a piece of information representative (EID) of at least one addressee entity for said frame;
 a step for inserting said piece of representative information (EID) within said header (HEA) of said data frame (PPDU), delivering a modified frame;
 a step for sending said modified data frame on said communications network in the form of a digital signal.

Thus, an embodiment of the invention enables the use of an existing header of the PPDU data frame to insert, for example by means of an orthogonal encoding or in a new field, the piece of representative information (EID) that is used by the terminals for which this piece of representative information is intended. The implementation of an embodiment of the invention is compatible with the use of existing materials. Indeed, it does not affect the non-modified terminals (compatible with a standard) since they are unaware of this piece of information.

In another embodiment of the invention, the EID can also be inserted into the existing field of the header.

In one particular embodiment of the invention, said piece of representative information is inserted at the PLCP sub-layer of the physical layer. This sub-layer corresponds to a set of specific fields of the data frame (PPDU).

According to one particular characteristic of an embodiment of the invention, said piece of information representative (EID) of at least one addressee entity for said frame is inserted into a signaling field of said header.

Thus, the implementation of an embodiment of the invention is compatible with the use of existing equipment: indeed, it does not affect the non-modified terminals (compatibles with a standard) since they are unaware of this information.

For example, said piece of representative information can be inserted into the Short Training Field (L-STF, HT-STF or VHT-STF).

The choice of the field into which said piece of representative information is inserted depends on the entities that constitute the network and are potential recipients of the frame.

Thus, the use of a field close to the start of the frame, such as the field L-SIG for example, offers the advantage of enabling greater energy savings inasmuch as the decoding step implemented by a recipient entity can lead more swiftly to the decoding of the piece of representative information.

The use of the L-SIG field is however suited only if all the potentially recipient entities implement an embodiment of the invention.

The choice of the HT-STF field enables a compatibility of the emission method according to an embodiment of the invention with a network comprising entities that do not implement an embodiment of the invention but are nevertheless compliant with the IEE 802.11n standard.

According to one particular characteristic of an embodiment of the invention, said step of insertion is done by an orthogonal encoding of said piece of representative information (EID) with one of the fields of said header (HEA) of said data frame (PPDU).

Thus, in this embodiment, the step of insertion of the EID in the current frame which leads to a modified frame is implemented through an orthogonal encoding making it possible to transmit, in a same predefined field, a piece of data compliant with the standard and the EID.

For example, to insert the EID into the L-SIG field, the L-SIG field of the current frame and the EID are mixed by means of an orthogonal modulation.

This embodiment of the invention by orthogonal encoding offers the advantage of enabling an insertion of the EID by modulation with any unspecified field of the frame, such as for example the existing L-SIG or HT-SIG fields or again a standardized field in a future development of a standard, such as the VHT-SIG field.

Thus with the encoded frame comprising especially the current frame, an entity, recipient of the encoded frame, that does not implement an embodiment of the invention is not disturbed by the insertion of the piece of representative information in a signaling field of said header. This mode of implementing the method of sending according to an embodiment of the invention therefore offers the advantage of entailing no restrictions in the implementation of an embodiment of the invention by each of the entities constituting the communications network.

According to another aspect, an embodiment of the invention also pertains to an entity (E1) connectable to a wireless communications network comprising a plurality of entities, said communications network being organized as a plurality of communications layers comprising a physical layer (PHY).

According to an embodiment of the invention, such an entity comprises, at an interface with said physical layer (PHY):
- means for receiving a header (HEA) of a data frame (PPDU);
- means for decoding said header (HEA) delivering at least one piece of information representative (EID) of at least one addressee entity for said frame;
- means for deactivating said recipient entity (E1) for said header (HEA) when the piece of information representative of said addressee entity designates an entity other than said recipient entity (E1).

Thus an entity implementing an embodiment of the invention can, as soon as the piece of representative information has been decoded, determine whether the frame is addressed to it or not and go into deactivation during the time in which the physical carrier (signal and frequency) is occupied by a frame not addressed to it. Such an embodiment of the invention is especially suited to a use by an entity furthermore implementing "power save" types of energy-saving modes, controlled for example by the MAC layer.

According to another aspect, an embodiment of the invention also pertains to an entity (E1) connectable to a wireless communications network comprising a plurality of entities, said communications network being organized as a plurality of communications layers comprising a physical layer (PHY).

According to an embodiment of the invention, said entity comprises, at an interface with said physical layer (PHY):
- means for building a piece of information (EID) representative of at least one addressee entity for said frame;
- means for inserting said piece of representative information (EID) into said header (HEA) of said data frame (PPDU), delivering a modified frame;
- means for sending said modified data frame on said communications network in the form of a digital signal.

The entity may comprise, in addition, means of configuration, used to define the insertion means to be used, depending on the entities constituting the communications network. Such configuration means can, for example, be implemented by an administrator of the communications network.

According to another aspect, an embodiment of the invention also pertains to a signal representative of a data frame (PPDU) sent out on the physical layer (PHY) of a wireless communications network, said frame comprising a header (HEA), According to an embodiment of the invention, such a signal comprises, within said header (HEA), addressed to a component for processing the signal of said physical layer, a piece of information (EID) representative of at least one addressee entity for said frame.

According to another aspect, an embodiment of the invention also pertains to a computer program, characterized in that it comprises program code instructions for implementing the method for deactivating as described here above, when the program is executed by a processor.

According to another aspect, an embodiment of the invention finally concerns a computer program characterized in that it comprises program code instructions to implement the method for sending as described here above, when this program is executed by a processor.

BRIEF DESCRIPTION OF THE DRAWINGS

Other features and advantages shall appear more clearly from the following description of a preferred embodiment, given by way of a simple, illustratory and non-restrictive example, and from the appended drawings, of which.

DETAILED DESCRIPTION OF ILLUSTRATIVE EMBODIMENTS

1. General Principle

Figure 1:
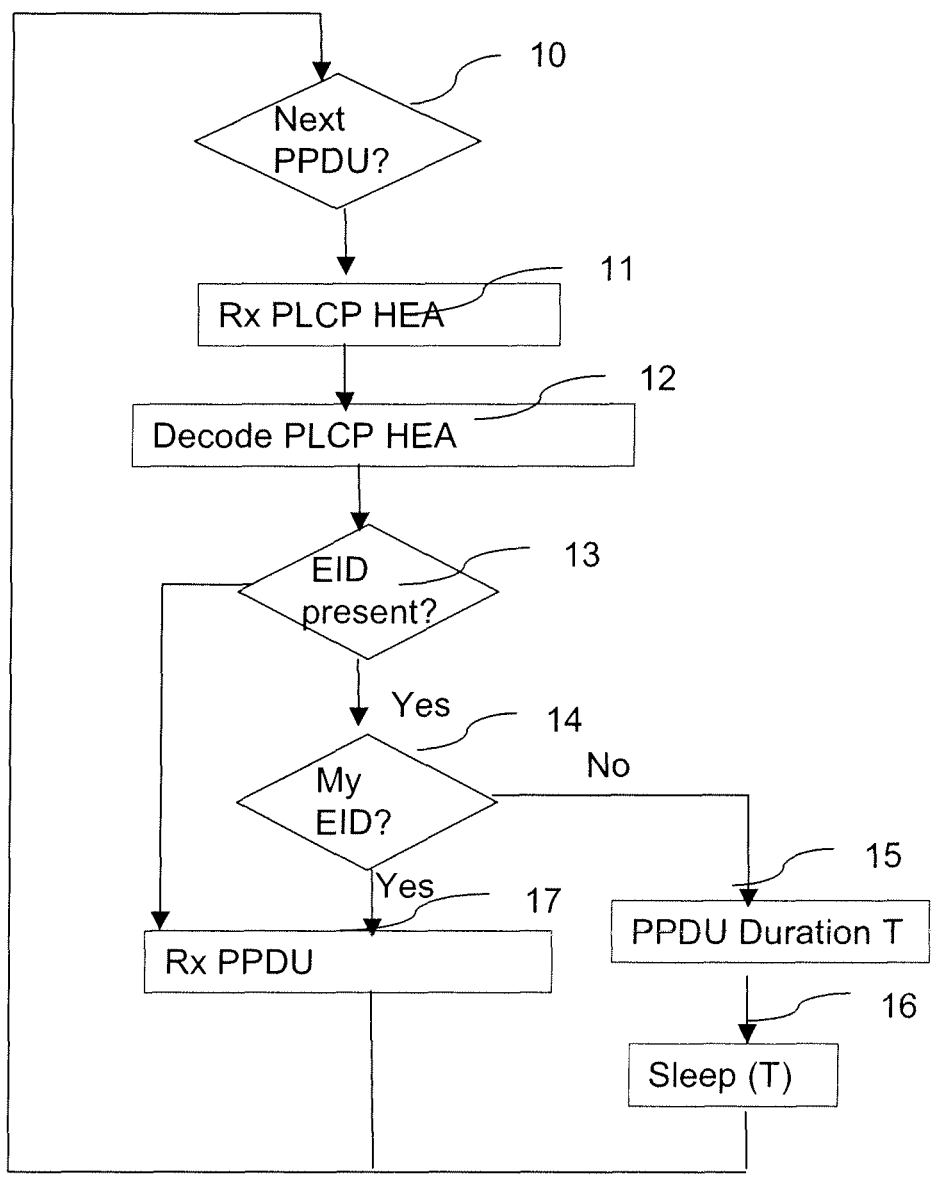
FIG. 1 presents a drawing illustrating the steps of the method for deactivating according to one particular embodiment of the invention.

An illustrative embodiment of the invention pertains to a method for deactivating at least one component of an entity of a wireless communications network organized in a plurality of communications layers comprising a physical layer, this network comprising several entities, for example access points or communications terminals.

In the prior-art wireless communications systems, the physical layer manages all the transmissions identically, whether it is unicast, multicast or broadcast streams, and whatever the addressee or addressees of the frame.

An embodiment of the invention, on the contrary, proposes a different processing of the frames in reception by the physical layer, depending on whether or not they concern the recipient entity.

As explained further below, the method according to an embodiment of the invention comprises, at the level of said physical layer:
- a step for receiving a header of a data frame extracted from a physical signal during its reception;
- a step for decoding this header without awaiting the reception of the entire frame, so as to obtain at least one piece of information representative (EID) of the addressee entity for the frame or a set of addressee entities, if it is a multicast transmission;
- a step for deactivating at least one of the components of the recipient entity receiving the header when the recipient entity is not the addressee of the frame being received, i.e. when the information representative of said recipient entity (EID) designates an entity other than said recipient entity.

Thus the method of an embodiment of the invention enables the encoding, in the header, of a frame of the physical layer, the type of transmission (unicast, broadcast or multicast) and a piece of information representative of the addressee entity for the frame (EID). In this way, the recipient entity, in particular a terminal or an access point of a BSS, can, upon the decoding of the header of the frame of the physical layer, detect whether this frame is intended for it or not, without having wait for the end of reception of the pieces of data and their decoding by the layers higher than the physical layer (MAC or IP layer especially). Consequently, it is then possible for the recipient entity to get deactivated, i.e. for example to cut off the electrical supply to a component or to cut off the electrical supply to the components of the entire data reception chain, for example during the transmission of the non-payload data units that follow this header. The deactivation can also consist of a general cut in the electrical power supply to all the components of the entity.

Thus, an embodiment of the invention makes it possible to overcome the drawbacks of the prior art and especially enables a wireless communications apparatus not to decode all the data elements of a frame of the physical layer that it receives if they are not intended for it and thus achieve appreciable energy savings as compared with the prior-art solutions.

Indeed, one of the major drawbacks of the prior-art solutions is that the identification of the addressee apparatus is done by the MAC layer and is therefore done only when the first pieces of data enabling identification of the addressee terminal have been received, more specifically after the entire MAC level data structure has been received, and this amounts to a major energy loss when the pieces of data received do not concern the recipient entity.

Moreover, the solution provided by an embodiment of the invention offers the advantage, in at least one embodiment, of being transparent to an apparatus that does not implement an embodiment of the invention, thus enabling interoperability between the apparatuses implementing the invention and another apparatus, for example a wireless apparatus, simply complying with one of the 802.11x standards.

2. Identification of the Addressee at the Physical Layer

In one specific embodiment, the invention proposes to add a piece of information to the header of each frame in the physical layer, for example the header of the PLCP (Physical Layer Convergence Procedure) sub-layer of the physical layer.

In the organization of the prior-art network communications systems, and more particularly the 802.11 standards, this PLCP sub-layer possesses only functions of synchronization, channel estimation and parametrization of the physical techniques used.

According to one particular embodiment, the invention proposes a novel implementation of the PLCP layer, the functions of which are enhanced to include the identification of the type of transmission (unicast or broadcast/multicast) and the identification of the addressee entities.

3. Encoding of a Piece of Information Representative of the Addressee Entity for the Frame (EID)

According to an embodiment of the invention, an EID can especially take account of two parameters of the MAC layer: the AID (Association Identifier) of the addressee entity and the BSSID (Basic Service Set Identifier), enabling the identification respectively of the entity (i.e. the terminal) and of the BSS of which it is a part.

In certain particular embodiments of the invention, the identification of the addressee, i.e. the EID, can be encoded on two bytes.

To guarantee the uniqueness of this encoding, these embodiments can include the use of a hash function.

For example, the encoding of an EID on two bytes can be the result of a hash function on the AID (2 bytes) and BSSID (6 bytes) parameters of the MAC layer, a fixed value (for example "FF FF") being reserved for the broadcast or multicast transmissions or when the AID and BSSID parameters are not yet known.

The AID parameter enables the entity to be identified at the level of the MAC layer. Such an AID parameter has numerous advantages as compared with a classic MAC address.

The AID parameter has a size of two bytes instead of six bytes for a classic MAC address, thus facilitating its insertion into a PLCP header for which the number of bits is restricted. Should the size of the EID be two bytes, the full AID parameter can be introduced into the PLCP header while the introduction of a classic MAC address necessitates a reduction of the size of this header from six bytes to two bytes: this corresponds to a partial MAC address. This reduction of the MAC address gives rise to a risk that it will not be possible to obtain unique identification of the entities. Indeed, a same partial MAC address can identify different entities, and this can result in an entity concerned by this standby not being put on standby when the EID has been built by means of a partial MAC address.

The AID parameter is assigned to an entity by the access point to which it is connected during a procedure of authentication of the entity. This limits the risk of having a same AID parameter assigned to two different entities connected to a same access point.

The BSSID is also of interest because two entities belonging to two different BSSs can have the same AID parameter, thus introducing a risk of confusion between entities. This is so especially when the two BSS are co-localized and use the same spectral resources (this is the case of overlapping BSS). In order to preserve the uniqueness of the EID, the EID is built by means of the parameter AID and the parameter BSSID in its complete or partial form.

Thus, an implementation such as this of an embodiment of the invention offers the advantage of defining, at the PLCP layer, a unique identifier of the addressee entity and an identifier indicating a multicast transmission, for example of the "broadcast" type.

4. Insertion of a Piece of Information Representative of the Addressee Entity (EID) for the Frame in the Physical Layer Certain embodiments of the invention include the definition of a new field, dedicated to an EID, in the header of the physical layer.

For example, a new two-byte field can be inserted into the SIGNAL field (at the "VHT_SIG" field for example).

In other embodiments of the invention, the encoding of the EID can be placed in an existing field of the frame transmitted on the physical layer, used for other purposes in the prior art, such as for example a Short Training Field (L-STF, HT-STF or VHT-STF) of the PLCP header.

This embodiment however makes it necessary to modify the content of existing fields, such as for example L-STF or HT-STF. Consequently, the frames encoded according to an embodiment of the invention can be decoded in the habitual way by recipient entities, provided that they are updated. This embodiment therefore implies that all the entities receiving a frame modified according to an embodiment of the invention are updated to enable an embodiment of the invention to be implemented.

In other embodiments of the invention, the encoding of an existing field can be modified to transmit the identifier of the addressee in parallel to the original information (or "legacy" information) already contained in the field. This can be done, for example, by an orthogonal encoding of the PLCP header.

Thus, for example, an already existing field such as the SIGNAL field can be used in passing from a BPSK (Binary Phase Shift Keying) encoding to a QPSK (Quadrature Phase Shift Keying) encoding for the entities that are not at the coverage limit.

Indeed, QPSK modulation makes it possible to transmit twice as much information as the BPSK modulation since it enables the encoding of information on the I axis and the Q axis instead of an encoding on only one axis. This technique however induces a loss of power which, even if it remains relatively low, slightly reduces the quality of the reception. Thus, these embodiments are more adapted to transmission towards entities (terminals or access points) not situated at the coverage limit.

For example, the classic and standardized pieces of information of the HT-SIG field are encoded in the Q axis and those corresponding to the identification of the addressee entity according to an embodiment of the invention are encoded on the I axis, or else the classic and standardized pieces of information of the L-SIG field are encoded on the I axis and those corresponding to the identification of the addressee entity are encoded on the Q axis.

These embodiments offer the advantage of enabling a decoding of a frame according to an embodiment of the invention by a recipient entity not implementing an embodiment of the invention without requiring that any modification whatsoever should be done on this entity. Indeed, the decision thresholds remain the same. An entity compliant with the prior-art techniques and not implementing an embodiment of the invention does not detect the change and can decode the original (or legacy) data as it did previously without being disturbed by the presence of the field indicating the identity of the addressee.

Thus, embodiments of the invention in which the identification information is encoded on an existing field of the header (L-STF or L-SIG), are adapted to all transmissions, including in an environment with coexistence between a sender entity which implements an embodiment of the invention and a prior-art recipient entity.

Other embodiments, which provide for an orthogonal encoding of the 'information on identification in a new field (HT or VHT), are adapted to transmissions to HT or VHT recipient entities implementing an embodiment of the invention.

Thus, according to certain embodiments, the invention comprises the definition of a new PLCP frame format for the data, comprising an encoding of a "quasi-unique" identifier per entity via a dedicated field or via an existing field (HT_STF or HT-SIG for example).

5. Description of an Embodiment of the Deactivation Method

FIG. 1 illustrates the steps of the method for deactivating according to an embodiment of the invention, implemented in an entity of a communications network during the reception of a data frame of the physical layer.

According to an embodiment of the invention, at the arrival of a new PPDU data frame 10, the method comprises a step 11 for receiving the header HEA of the data frame. In the particular embodiment illustrate in FIG. 1, this is the header of the PCLP sub-layer of the frame in reception.

This step of reception of the header 11 is followed by a step for decoding this header 12, during which an attempt is made for extracting a piece of information representative EID of the addressee entity.

If the extraction attempt is successful 13, i.e. if the frame in reception implements an embodiment of the invention and includes the EID of its addressee, then the method comprises a step 14 for comparing the received EID with the EID associated with the recipient communications entity.

Indeed, if the recipient entity implements an embodiment of the invention and if the signal transmitted has also been modified according to an embodiment of the invention, then it has the EID identifier of the addressee available to it at the end of reception of the PLCP header. By comparing this identifier with its own EID identifier, it can know if the ongoing transmission is for itself or is of no concern to it.

Thus, the energy-saving mechanism of an embodiment of the invention offers the advantage wherein it can be activated as soon as the reception of the PLCP header is ended.

If the IEDs are different then, since the recipient entity is not the addressee of the frame in reception, then the method comprises a step 15 for computing the duration T of reception of the PPDU data frame based on the parameters such as length and bit rate available in the HEA header.

Finally, this computation step 15 is followed by a step 16 for deactivating 16 the communications entity during the determined period T. In one particular embodiment, it can be that the communications entity will not deactivate, using a criterion of frame length below a predefined threshold (for example 20 bytes). This intermediate mode makes it possible to listen to very short control frames, for example RTS (Request To Send) or CTS (Clear To Send) type frames, that are useful especially for updating the NAV (Network Allocation Vector) at the MAC layer and are of the order of 14 bytes, and to prevent excess consumption of energy related to the current peaks generated during the transition phases. Thus, in this specific embodiment of the invention, the method for deactivating comprises a step for deciding on the relevance of the deactivation as a function of the length of the frame.

If the IEDs are identical, or if the EID received corresponds to a multicast transmission mode, or if the frame at reception does not comprise any EID enabling its addressee to be identified, then the method provides for a last step 17 for receiving the remainder of the PPDU data.

6. Determining the Deactivation Time

According to an embodiment of the invention, when the two IEDs are different, the method comprises a step for computing the duration of deactivation during which it is sure that it is not concerned by the ongoing transmission.

In one particular embodiment of the method of the invention, the recipient entity uses, for this purpose, information on the bit rate and the size of the data frame being received by the physical layer, from which it computes the duration T of the ongoing transmission. For example, in one particular embodiment of the invention, the recipient entity bases itself on the formula described in the standard of the physical layer that it uses. Thus, if the standard used is the 802.11a standard, then the recipient entity can for example compute the duration of transmission in compliance with paragraph 17.4.3 "OFDM TXTIME calculation" of this standard.

For example, in one particular embodiment of the invention, the recipient entity can use information which too is contained in the header of the frame received by the physical layer, such as for example the PSF and PLW fields of the PLCP header, the PSF (PLCP_SIGNALING FIELD) designating the bit rate in Mbit/s, and the PLW (PSDU LENGTH WORD) field designating the number of bytes of the frame received.

This computation is done systematically by the recipient entity at the end of reception of the PLCP header.

If the transmission in progress no longer concerns it, the recipient entity takes the decision to get deactivated for the duration T of the transmission to come.

Thus, if it is estimated that the time of reception of a data frame in the physical layer is of the order of 300 µs to 1 millisecond and that the time of reception of a first part of the header of the physical layer, going from the beginning of the header to the field containing the identifier of the addressee of the frame, is of the order of 30 to 40 microseconds (i.e.

therefore of the order of one-hundredth of the time of reception of the frame), then it can be understood that the definition of an energy-saving mode in the physical layer according to an embodiment of the invention is more efficient than the "power save" modes habitually defined at the MAC layer. Thus, as compared with the prior-art solutions, an embodiment of the invention enables a considerable gain in time to detect the occupation of the channel by other users and, therefore, consequently a very considerable saving of energy.

The current consumption of a WiFi component in data reception mode is of the order of 400 mA, whereas in standby mode it is solely of the order of 40 mA. Taking a 3.3V power supply, it is possible to compute the power saving. The consumed power diminishes therefore by a factor of 10, for a data frame received through the physical layer by a recipient entity. The greater the extent to which the radio environment is occupied by a substantial transmissions because of the large number of entities or major data flows, for example in case of big data streams, the greater will be the savings. An embodiment of the invention thus, among other advantages, makes it possible not to consume energy for transmission related to another BSS. In the specific embodiment of the invention where the electrical power supply to the component is cut off, the energy saving is even greater since the radiofrequency transmission/reception component is not powered at all. It therefore does not consume any current.

In another particular implementation of an embodiment of the invention, the deactivation time takes account of both the duration T of transmission de la frame and the time elapsed to acknowledge this frame. This embodiment prolongs the deactivation until the end of the next ACK frame.

7. Effect of the Deactivation

In the particular embodiment of the invention described here, the step for deactivating 16 the recipient entity is entirely performed at the physical layer.

Indeed, the pieces of information elements triggering the deactivation are information contained in the headers of the physical layer, the MAC layer being only informed that the channel is busy for a duration corresponding to the duration of transmission of a the frame not intended for the recipient entity.

Furthermore, the effect of the deactivation of the recipient entity can fluctuate according to the implementations of an embodiment of the invention. In particular, it can depend on the recipient entity, its manufacturer for example, but also on the functions or capacities of the recipient entity.

For example, the deactivation can correspond to a cut in the supply to the radiofrequency components and/or a cut in the supply to the reception and transmission chain of the physical layer. In this case, the deactivation corresponds to the powering down of a component of the recipient entity.

The deactivation can also correspond to a powering down of other components de the recipient entity, which are more or less linked to the component receiving the signals of the wireless communication.

Finally, the deactivation can lead to the deactivation of all the components of the entity when this entity is, for example, in standby state.

The deactivation according to an embodiment of the invention is useful for example in the case of terminals that are inactive. It is known that even when a terminal is inactive (i.e. it is not being used), certain components of the terminal continue nevertheless to work. These components include especially radio-signal transmission/reception signals. Thus, although they are in a standby state, a terminal of the type described here above consumes energy all the same. The deactivation according to an embodiment of the invention makes it possible to save further energy and therefore to extend the use of the terminal.

An embodiment of the invention can therefore to a great extent be distinguished from the prior-art techniques since the MAC, according to an embodiment of the invention, is not involved in the deactivation decision, and does not control the deactivation decision as it did in the prior-art "power save" techniques. Furthermore, the goal of an embodiment of the invention is different: the idea is not to set up programmed phases of standby and activity but to go into deactivation during a phase of activity when the channel is occupied by other users. In this sense, the technique for going into standby according to an embodiment of the invention is universal for it can be used by an access point and by entities, during all transmissions, and therefore also during the wake-up phases of the entities in "power save" mode according to the techniques of the prior art.

8. Structure of a Communications Entity Adapted to the Implementing of the Method for Deactivating.

Figure 2:
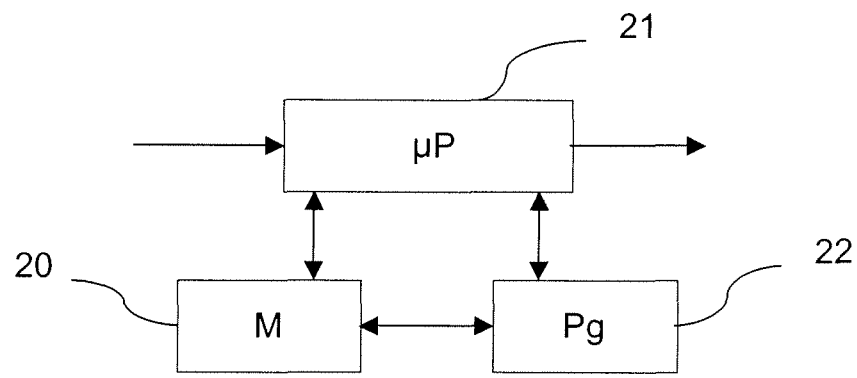
FIG. 2 represents an entity adapted to the implementing of the method for deactivating according to an embodiment of the invention.

Referring to FIG. 2, we present the simplified structure of an entity connectable to a wireless communications network comprising a plurality of entities, this communications network being organized as a plurality of communications layers comprising a physical layer, according to the embodiments described here above.

An entity of this kind comprises a memory 21 comprising a buffer memory, a processing unit 22, equipped for example with a microprocessor µP and driven by the computer program 23 implementing the method for deactivating according to an embodiment of the invention.

At initialization, the code instructions of the computer program 23 are for example loaded into a RAM and then executed by the processor of the processing unit 22.

The processing unit 22 receives at input a header of a data frame.

The microprocessor of the processing unit 22 implements the steps of the sending method described here above, according to the instructions of the computer program 23. To this end, the entity comprises, in addition to the buffer memory 31, at the interface with the physical layer:
- means for receiving a header of a data frame;
- means for decoding the header delivering at least one piece of information representative of at least one addressee entity for said frame;
- means for deactivating the recipient entity for the header when the piece of information representative of the addressee entity designates an entity other than the recipient entity.

These means are driven by the microprocessor of the processing unit 22.

9. Structure of a Communications Entity Adapted to Implementing a Method for Sending According to an Exemplary Embodiment.

Figure 3:
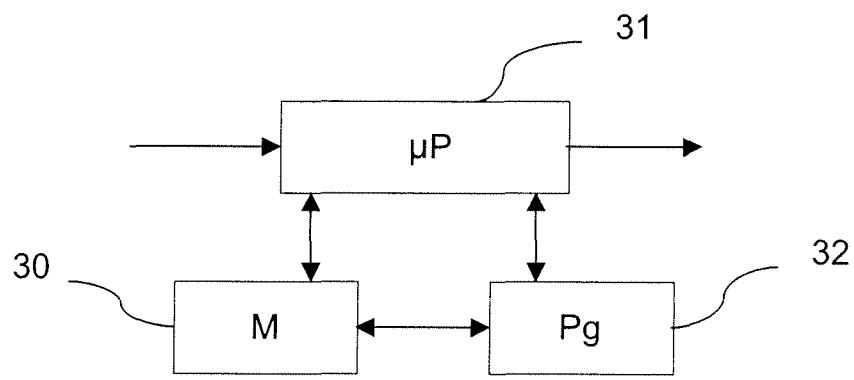
FIG. 3 represents an entity adapted to the implementing of the method for sending according to an embodiment of the invention.

Finally, referring to FIG. 3, we present the simplified structure of an entity connectable to a wireless communications network comprising a plurality of entities, said communications network being organized as a plurality of communications layers comprising a physical layer, according to the embodiments described here above . . . .

An entity of this kind comprises a memory 31 comprising a buffer memory, a processing unit 32 equipped for example with a microprocessor µP and driven by the computer program 33 implementing the method for receiving and/or the method for sending according to an embodiment of the invention.

At initialization, the code instructions of the computer program 33 are for example loaded into a RAM and then executed by the processor of the processing unit 32.

According to an embodiment of the invention, the microprocessor of the processing unit 32 implements the steps of the decoding method described here above according to the instructions of the computer program 33. To this end, the entity comprises, in addition to the buffer memory 11, at an interface with the physical layer:
- means for building a piece of information representative of at least one addressee entity for the frame;
- means for inserting the piece of representative information into said header of the data frame, delivering a modified frame;
- means for sending the modified data frame on the communications network in the form of a digital signal.

These means are driven by the microprocessor of the processing unit.

The invention claimed is:

1. A method for deactivating at least one component of an entity of a wireless communications network comprising a plurality of entities, said communications network being organized into a plurality of communications layers comprising a physical layer, wherein the method comprises, at the physical layer, steps of:
- receiving a header of a data frame extracted from a signal being received with a recipient entity;
- decoding at least a signaling field of said header delivering at least one piece of information representative of at least one addressee entity for said frame, said at least one piece of information taking account of a result of a hash function applied on only an Association Identifier of said at least one addressee entity and a Basic Service Set Identifier; and
- deactivating at least one component of said recipient entity for said header, when the piece of information representative of said at least one addressee entity designates an entity other than said recipient entity.

2. The method according to claim 1, wherein the method furthermore comprises computing a duration of deactivation as a function of:
- at least one piece of information representative of a transmission rate; and
- at least one piece of information representative of a volume of data of said data frame of the physical layer.

3. The method according to claim 1, wherein the step of deactivating comprises a cutting off an electrical power supply to at least one radiofrequency component of said entity.

4. The method according to claim 1, wherein deactivating comprises cutting off an electrical supply to a data reception and/or transmission chain of the physical layer.

5. A method for sending a data frame, comprising a header, by a sender entity of a wireless communications network comprising a plurality of entities, wherein two adjacent entities are interconnected by a physical support and said communications network being organized into a plurality of communications layers comprising a physical layer, wherein the method comprises, at said physical layer, steps of:
- building said data frame;
- building a piece of information representative of at least one addressee entity for said frame from at least one parameter of a layer that controls access to the physical support, said piece of information taking account of a result of a hash function applied on only an Association Identifier of said at least one addressee entity and a Basic Service Set Identifier;
- inserting said piece of representative information into at least a signaling field of said header of said data frame, delivering a modified frame; and
- sending said modified data frame on said communications network in a digital signal.

6. The method for sending according to claim 5, wherein said step of insertion is done by an orthogonal encoding of said piece of representative information with said signaling field of said header of said data frame.

7. An entity connectable to a wireless communications network comprising a plurality of entities, said communications network being organized as a plurality of communications layers comprising a physical layer, wherein the entity comprises:
- a processor, which is configured to receive a header of a data frame at an interface with the physical layer, decode at least a signaling field of said header, deliver at least one piece of information representative of at least one addressee entity for said frame, said at least one piece of information taking account of a result of a hash function applied on only an Association Identifier of said at least one addressee entity and a Basic Service Set Identifier, and deactivate said recipient entity for said header when the at least one piece of information representative of said at least one addressee entity designates an entity other than said recipient entity.

8. An entity connectable to a wireless communications network comprising a plurality of entities, said communications network being organized as a plurality of communications layers comprising a physical layer, wherein the entity comprises:
- a processor configured to build said data frame, build a piece of information representative of at least one addressee entity for said frame, said piece of information taking account of a result of a hash function applied on only an Association Identifier of said at least one addressee entity and a Basic Service Set Identifier, insert said piece of representative information into at least a signaling field of said header of said data frame at an interface with said physical layer, deliver a modified data frame, and send said modified data frame on said communications network in a digital signal.

9. A method comprising:
- generating, with a sending entity device, a signal representative of a data frame sent out on a physical layer of a wireless communications network, said frame comprising a header, said header being intended for a component for processing the signal at said physical layer, wherein the signal comprises, within at least a signaling field of said header, a piece of information representative of at least one addressee entity for said frame; said piece of information taking account of a result of a hash function applied on only an Association Identifier of said at least one addressee entity and a Basic Service Set Identifier; and
- transmitting the signal from the sending entity device.

10. A non-transitory computer readable memory comprising a computer program stored thereon, which includes program code instructions for implementing a method for deactivating at least one component of an entity of a wireless communications network comprising a plurality of entities, wherein two adjacent entities are interconnected by a physical support, when the program is executed by a processor, said communications network being organized into a plurality of communications layers comprising a physical layer, wherein the instructions comprise:

instructions configured to receive at the physical layer a header of a data frame extracted from a signal being received with a recipient entity;

instructions configured to decode at least a signaling field of said header delivering at least one piece of information representative of at least one addressee entity for said frame, said at least one piece of information taking account of a result of a hash function applied on only an Association Identifier of said at least one addressee entity and a Basic Service Set Identifier; and instructions configured to deactivate at least one component of said recipient entity for said header, when the piece of information representative of said at least one addressee entity designates an entity other than said recipient entity.

11. A non-transitory computer readable memory comprising a computer program stored thereon, which includes program code instructions to implement a method for sending a data frame, comprising a header, by a sender entity of a wireless communications network comprising a plurality of entities, wherein two adjacent entities are interconnected by a physical support, when this program is executed by a processor, said communications network being organized into a plurality of communications layers comprising a physical layer, wherein the instructions comprise:

instructions configured to build said data frame;

instructions configured to build a piece of information representative of at least one addressee entity for said data frame from at least one parameter of a layer that controls access to the physical support, said piece of information taking account of a result of a hash function applied on only an Association Identifier of said at least one addressee entity and a Basic Service Set Identifier;

instructions configured to insert said piece of representative information into at least a signaling field of said header of said data frame, delivering a modified frame; and instructions configured to send on said physical layer said modified data frame on said communications network in a digital signal.

* * * * *